United States Patent
Sinha et al.

(10) Patent No.: US 11,173,510 B2
(45) Date of Patent: Nov. 16, 2021

(54) IMAGING DEVICE FOR IDENTIFYING A LIQUID WITHIN A DISPENSER

(71) Applicant: TWENTY TWENTY THERAPEUTICS LLC, South San Francisco, CA (US)

(72) Inventors: Supriyo Sinha, Menlo Park, CA (US); Michael Allen, San Francisco, CA (US); Todd Whitehurst, Belmont, CA (US); Dimitri Azar, San Francisco, CA (US)

(73) Assignee: TWENTY TWENTY THERAPEUTICS LLC, South San Francisco, CA (US)

( * ) Notice: Subject to any disclaimer, the term of this patent is extended or adjusted under 35 U.S.C. 154(b) by 0 days.

(21) Appl. No.: 16/819,314

(22) Filed: Mar. 16, 2020

(65) Prior Publication Data
US 2020/0298264 A1 Sep. 24, 2020

Related U.S. Application Data

(60) Provisional application No. 62/822,191, filed on Mar. 22, 2019.

(51) Int. Cl.
*B05B 12/12* (2006.01)
*G02B 6/44* (2006.01)
*G02B 9/06* (2006.01)

(52) U.S. Cl.
CPC .......... *B05B 12/122* (2013.01); *G02B 6/4415* (2013.01); *G02B 9/06* (2013.01)

(58) Field of Classification Search
CPC ...... B05B 12/122; G02B 6/4415; G02B 9/06; G02B 9/6273; G02B 9/00624; G02B 6/209
See application file for complete search history.

(56) References Cited

U.S. PATENT DOCUMENTS 5,048,100 A * 9/1991 Kuperstein .............. G06N 3/02
382/157
5,063,601 A * 11/1991 Hayduk ................. G06N 3/063
706/39

(Continued)

FOREIGN PATENT DOCUMENTS

WO 2013116661 8/2013
WO 2018044758 3/2018

OTHER PUBLICATIONS

International Application No. PCT/US2020/023003, International Search Report and Written Opinion, dated Jun. 24, 2020, 11 pages.

*Primary Examiner* — Vishal Pancholi
(74) *Attorney, Agent, or Firm* — Haynes and Boone, LLP (57) ABSTRACT

Systems and methods for determining the identity of a liquid within a liquid dispenser are provided. A device includes a holder having an opening that is configured to retain the liquid dispenser. A surface of the liquid dispenser is configured to affix a label identifying a liquid within the liquid dispenser. A plurality of lenses are mounted on the holder. Each lens has a respective field of view that includes a respective portion of the surface of the liquid dispenser. In addition, the device includes a plurality of fiber bundles. Each fiber bundle includes an input that is configured to receive a respective signal from a respective one of the plurality of lenses. Further, the device includes an imaging sensor that is configured to receive the respective signals from the plurality of fiber bundles and to form a plurality of images of the surface of the liquid dispenser.

20 Claims, 10 Drawing Sheets

(56) References Cited

U.S. PATENT DOCUMENTS

| | | | | |
|---|---|---|---|---|
| 5,067,164 | A | * | 11/1991 | Denker .................... G06N 3/04 |
| | | | | 382/158 |
| 7,450,119 | B2 | * | 11/2008 | Eckstein ................... G06T 1/20 |
| | | | | 345/420 |
| 9,839,391 | B2 | | 12/2017 | Eaton et al. |
| 2010/0324936 | A1 | * | 12/2010 | Vishnubhatla ......... G16H 50/70 |
| | | | | 705/3 |
| 2011/0181767 | A1 | | 7/2011 | Neutzler et al. |
| 2014/0228783 | A1 | | 8/2014 | Kraft |
| 2014/0374480 | A1 | * | 12/2014 | Pollack ............ G01N 35/00732 |
| | | | | 235/440 |
| 2018/0353327 | A1 | | 12/2018 | Fateh et al. |

\* cited by examiner

IMAGING DEVICE FOR IDENTIFYING A LIQUID WITHIN A DISPENSER

CROSS-REFERENCE TO RELATED APPLICATIONS

This application claims priority under 35 U.S.C. § 119 to U.S. Provisional Patent Application No. 62/822,191, filed on Mar. 22, 2019, the contents of which are hereby incorporated by reference in their entirety.

BACKGROUND OF THE INVENTION

A significant fraction of the adult population needs to apply eye drops to treat or manage a variety of medical conditions. Some examples of these conditions include environmental allergies, cancer, and glaucoma. Individuals with chronic eye conditions may need to dispense many different medications at different doses and intervals.

For all medications, especially prescription medications, it may be important to monitor when the medication is applied to ensure that the patient complies with the doctor's instructions, and to prevent the patient from accidentally overdosing on the medication. In order to perform this monitoring, it is necessary to determine the drug that is applied, the dosage of the drug, and the time of application of the drug. The dosage and the time of application may be collected with a smart eye dropper device, which logs the dosage with a timestamp. However, related art smart eye dropper devices are unable to automatically identify the drug that is applied.

There are a variety of methods that could be used to identify the drug. For example, the patient could log the name of the drug that was applied into a notebook or a smartphone. However, it is likely that a patient would forget to log the name of the drug or accidentally log the incorrect drug. As another example, the patient could take a picture of a label identifying the drug on the dispenser bottle. However, it is likely that the patient would forget to take the picture, or choose not to take the picture due to the inconvenience. As yet another example, a passive electronic tag, such as a passive radio-frequency identification (RFID) tag, could be added to the dispenser bottle and read by a smart eye dropper device. However, this would require the drug manufacturer to include the RFID tag on the dispenser bottle, which would increase the cost and complexity of the manufacturing process.

SUMMARY OF THE INVENTION

Exemplary embodiments of the invention provide systems and methods for determining the identity of a liquid within a liquid dispenser. The liquid may be a drug that has been prescribed for a user. According to an aspect of the invention, a device includes a holder having an opening that is configured to retain a liquid dispenser. A surface of the liquid dispenser is configured to affix a label identifying a liquid within the liquid dispenser. The device also includes a plurality of lenses mounted on the holder. Each lens of the plurality of lenses has a respective field of view that includes a respective portion of the surface of the liquid dispenser. In addition, the device includes a plurality of fiber bundles. Each fiber bundle of the plurality of fiber bundles includes an input that is configured to receive a respective signal from a respective one of the plurality of lenses. Further, the device includes an imaging sensor that is configured to receive the respective signals from the plurality of fiber bundles and to form a plurality of images of the surface of the liquid dispenser as a function of the respective signals.

The plurality of lenses may include a first lens and a second lens. The first lens may be oriented at a first angle with respect to an axis that is parallel to the surface of the liquid dispenser, the second lens may be oriented at a second angle with respect to the axis, and the second angle may be different from the first angle. Alternatively or in addition, the first lens may have a first demagnification, the second lens may have a second demagnification, and the second demagnification may be different from the first demagnification.

Each lens of the plurality of lenses may be oriented at a same angle with respect to an axis that is parallel to the surface of the liquid dispenser. A respective output of each fiber bundle of the plurality of fiber bundles may be butt-coupled to the imaging sensor. Alternatively, the device may also include a relay lens that is configured to relay the respective signals from respective outputs of the plurality of fiber bundles to the imaging sensor.

Alternatively or in addition, the device may also include a transmitter that is configured to output the plurality of images of the surface of the liquid dispenser. Alternatively or in addition, the device may also include a light source that is configured to illuminate the surface of the liquid dispenser. The plurality of lenses may be configured such that a combination of the respective fields of view of the plurality of lenses covers an entire circumference of the surface of the liquid dispenser.

According to another aspect of the invention, a system is provided that includes the device, one or more data processors, and a non-transitory computer readable storage medium containing instructions that when executed on the one or more data processors, cause the one or more data processors to perform actions including receiving the plurality of images of the surface of the liquid dispenser from the imaging sensor, and using a trained artificial neural network to determine an identity of the liquid within the liquid dispenser as a function of the plurality of images of the surface of the liquid dispenser. The instructions may further cause the one or more data processors to perform actions including combining the plurality of images of the surface of the liquid dispenser into a single image that includes the label affixed on the surface of the liquid dispenser. The one or more data processors may determine the identity of the liquid within the liquid dispenser as a function of the single image. For example, the one or more data processors may determine the identity of the liquid within the liquid dispenser as a function of the label within the single image.

Other objects, advantages, and novel features of the present invention will become apparent from the following detailed description of the invention when considered in conjunction with the accompanying drawings.

BRIEF DESCRIPTION OF THE DRAWINGS

The present disclosure is described in conjunction with the appended figures.

DETAILED DESCRIPTION OF THE INVENTION

Figure 1:
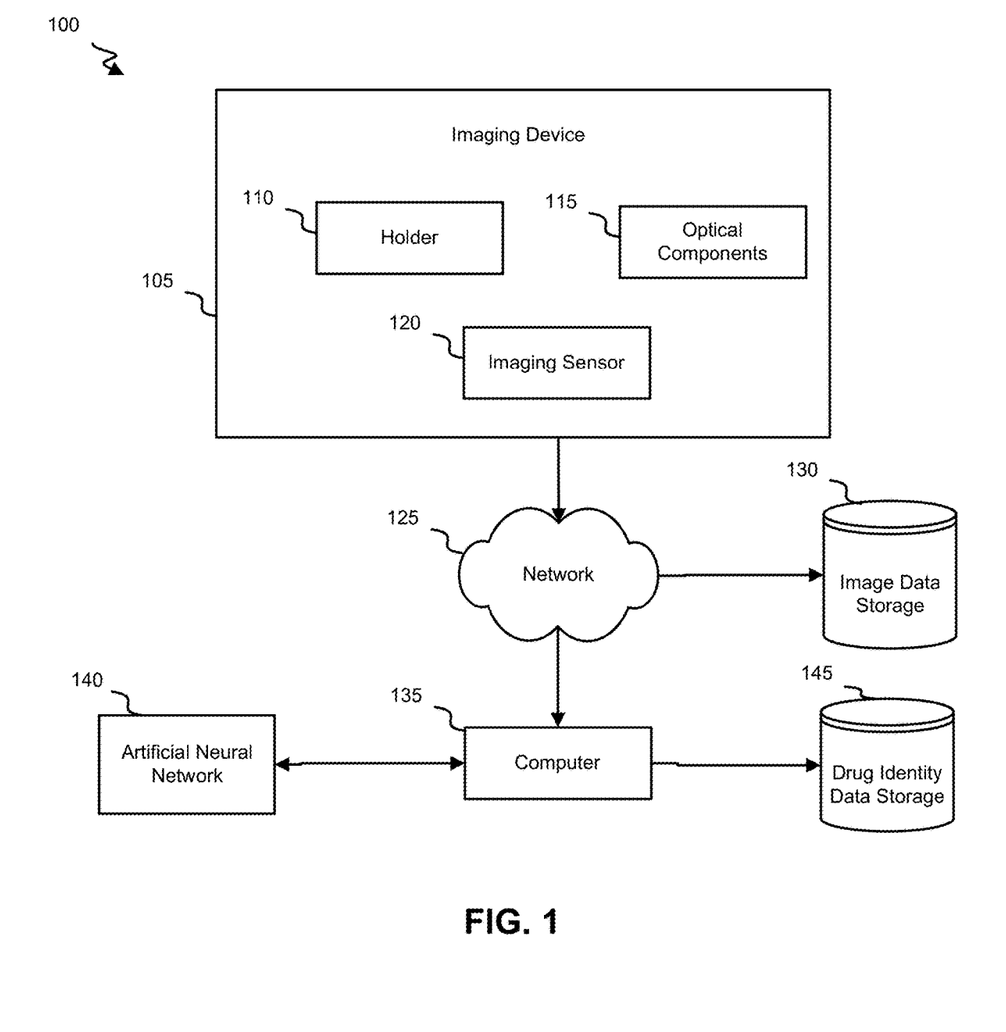
FIG. 1 shows a block diagram of a system for determining the identity of a liquid within a liquid dispenser according to exemplary embodiments of the invention.

FIG. 1 shows a block diagram of a system 100 for determining the identity of a liquid within a liquid dispenser according to exemplary embodiments of the invention. As shown in FIG. 1, the system 100 includes an imaging device 105. As discussed in further detail below, the imaging device 105 may include a holder 110, optical components 115, and an imaging sensor 120. The imaging device 105 may also include one or more computers, each of which may include one or more processors and/or a transceiver for communicating with a computer 135 through a network 125. The imaging device 105 may communicate with the computer 135 by any suitable connection, such as a wired or wireless network 125 based on Bluetooth or WiFi. The computer 135 may be housed within any suitable device, such as a smartphone.

As discussed in further detail below, the imaging device 105 may acquire a plurality of images of a surface of a liquid dispenser that is held within the holder 110. A label identifying the liquid, such as a prescription medication, may be affixed to the surface of the liquid dispenser. The imaging device 105 may transmit the plurality of images to the computer 135 through the network 125. The plurality of images may be stored in an image data storage 130 and/or in the computer 135.

The computer 135 may include one or more processors that receive the plurality of images from the imaging device 105 and use a trained artificial neural network 140 to determine the identity of the liquid within the liquid dispenser by analyzing the plurality of images. The plurality of images may be analyzed individually or as a combination. For example, the one or more processors may perform various imaging processing techniques to combine the plurality of images into a single image. The image processing techniques may account for different demagnifications and/or angles of the plurality of images. The artificial neural network 140 may match the label on the surface of the liquid dispenser against a database of medications that have been prescribed for the user. The artificial neural network 140 may determine the most likely match, along with a confidence score for the most likely match. The identity of the most likely match may be stored in a drug identity data storage 145, along with a timestamp and dosage for each administration of the drug.

Figure 2:
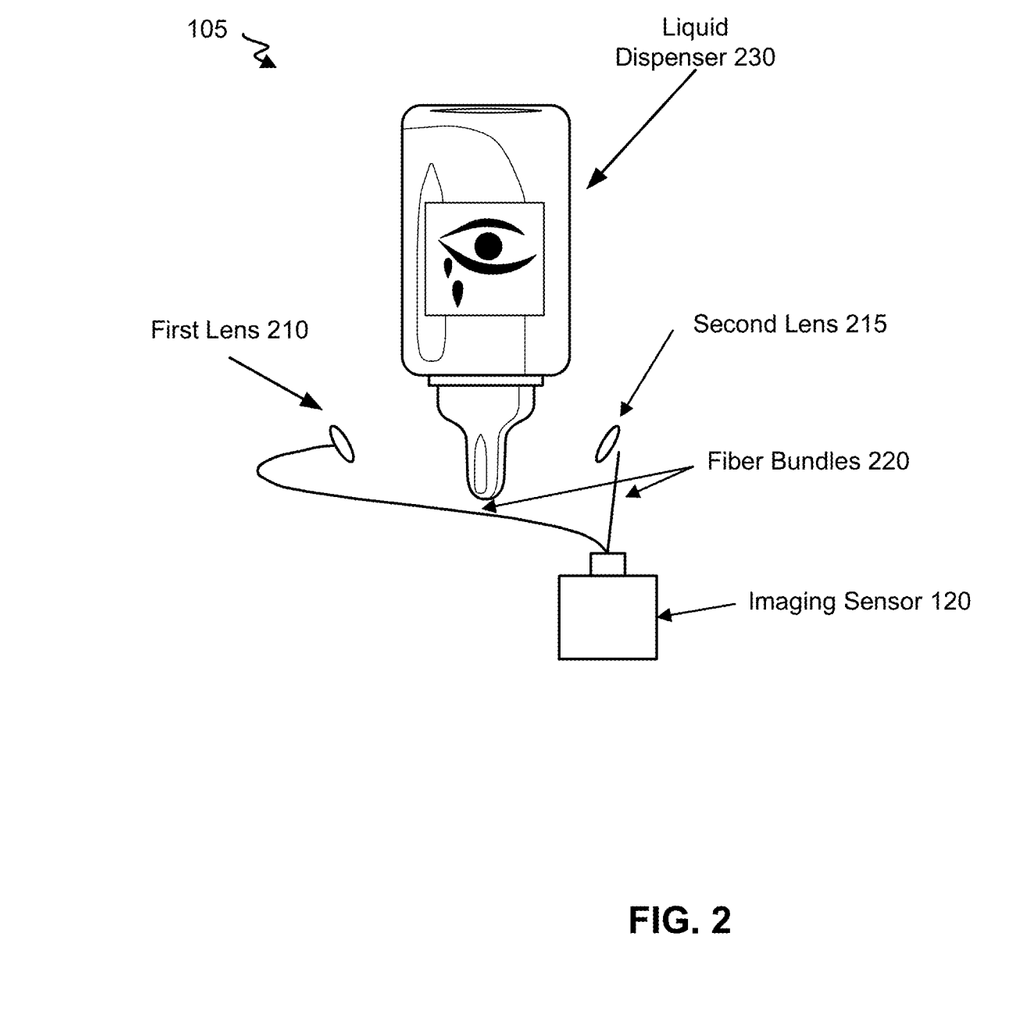
FIG. 2 shows a schematic diagram of an imaging device for determining the identity of a liquid within a liquid dispenser according to exemplary embodiments of the invention.

FIG. 2 shows a schematic diagram of an imaging device 105 for determining the identity of a liquid within a liquid dispenser according to exemplary embodiments of the invention. The imaging device 105 may include a first lens 210, a second lens 215, a plurality of fiber bundles 220, and an imaging sensor 120. Although two lenses are shown in FIG. 2, any suitable number of lenses may be used. The first lens 210 and the second lens 215 may be configured to acquire images of the surface of a liquid dispenser 230 on which a label identifying the liquid within the liquid dispenser 230 is affixed.

Each of the first lens 210 and the second lens 215 may have a field of view that includes a respective portion of the surface of the liquid dispenser 230. There may be at least a partial overlap between the fields of view of the first lens 210 and the second lens 215. The first lens 210 and the second lens 215 may have the same optical properties or different optical properties. For example, the first lens 210 may have a first demagnification, and the second lens 215 may have a second demagnification that is different from the first demagnification. Further, the first lens 210 and the second lens 215 may be positioned at different distances or the same distance from the surface of the liquid dispenser 230. Alternatively or in addition, the first lens 210 and the second lens 215 may be oriented at different angles or the same angle with respect to an axis that is parallel to the surface of the liquid dispenser 230. The first lens 210 and the second lens 215 may be configured such that a combination of the field of view of the first lens 210 and the field of view of the second lens 215 covers an entire circumference of the surface of the liquid dispenser 230. Such a configuration ensures that at least a portion of the label on the surface of the liquid dispenser 230 is captured in at least one of the images.

Each of the first lens 210 and the second lens 215 may have a demagnification that is at least 30×. Further, each of the first lens 210 and the second lens 215 may have a relatively high f/#, in order to provide a high depth of field. For example, the depth of field may be on the order of several centimeters, such as approximately 4 cm. This provides the ability to image the surfaces of liquid dispensers 230 having different diameters, and/or to orient the first lens 210 and the second lens 215 at relatively steep angles with respect to an axis that is parallel to the surface of the liquid dispenser 230. For example, the angles may range from 0° to approximately 65°.

Each of the plurality of fiber bundles 220 has an input that is configured to receive a respective signal from a respective one of the lenses. Each of the plurality of fiber bundles 220 is used to relay a view of the surface of the liquid dispenser 230 that is acquired by the respective one of the lenses to the imaging sensor 120. Each of the plurality of fiber bundles 220 may include a plurality of individual fibers. For example, a fiber bundle 220 having 10,000 individual fibers would form an image having 10,000 pixels. The amount of data that is transferred to the computer 135 may be minimized by using fiber bundles 220 having 10,000 or fewer individual fibers.

Each of the plurality of fiber bundles 220 may be butt-coupled to the imaging sensor 120. Alternatively, a relay lens may be positioned between a respective one of the plurality of fiber bundles 220 and the imaging sensor 120, such that the relay lens relays the respective signal from the output of the respective one of the plurality of fiber bundles 220 to the imaging sensor 120. Alternatively, a single relay lens may be used to relay the signals from all of the plurality of fiber bundles 220 to the imaging sensor 120. The imaging sensor 120 forms an image from each of the respective signals from the fiber bundles 220.

The imaging device 105 may also include a light source that is configured to illuminate the surface of the liquid dispenser 230. For example, the light source may include a plurality of light-emitting diodes (LEDs), each of which emits a different color of light. A plurality of images may be acquired for each of the emission colors. Alternatively or in addition, a mid-infrared (mid-IR) light source may be used to determine the level of remaining liquid in the liquid dispenser 230. The level of remaining liquid may be stored in the drug identity data storage 145, and may be used to alert the user that it is time to order a refill of the prescription.

Figure 3A:
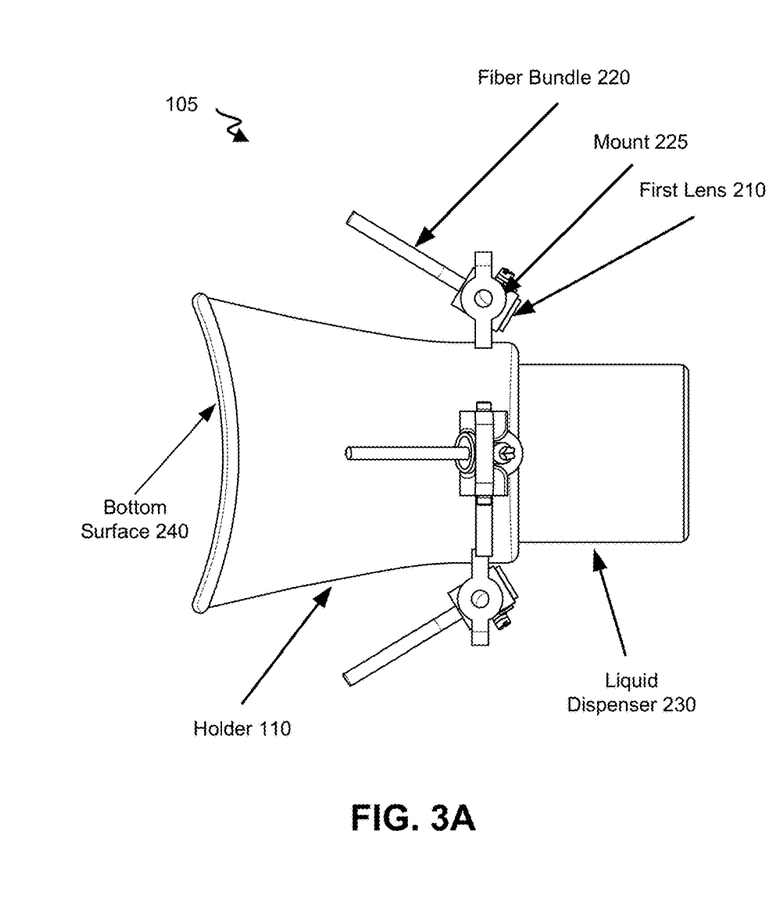
FIGS. 3A and 3B show perspective views of an imaging device for determining the identity of a liquid within a liquid dispenser according to exemplary embodiments of the invention.
Figure 3B:
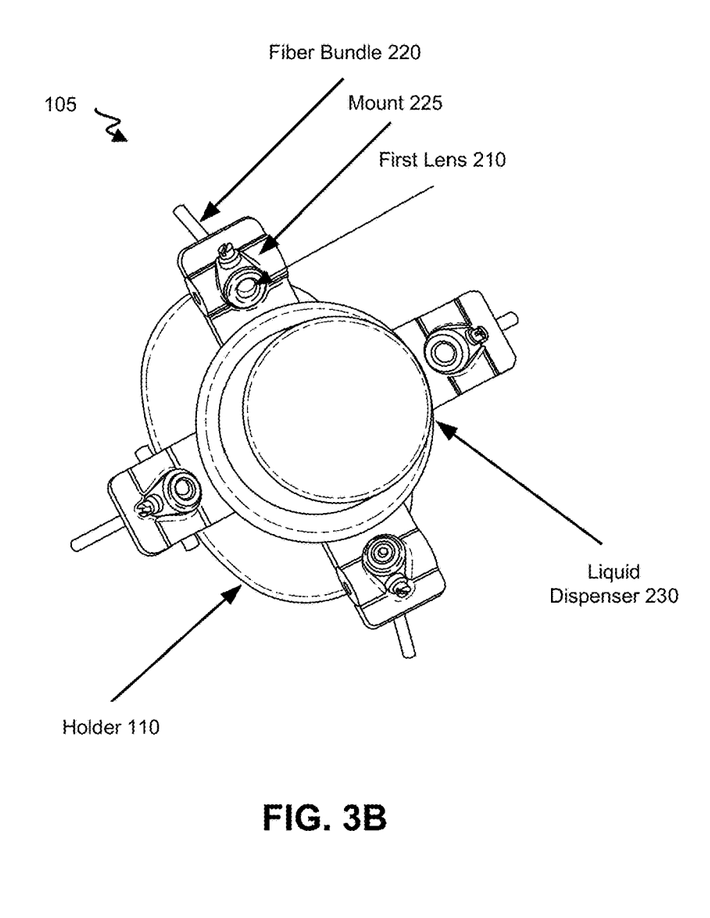

FIGS. 3A and 3B show perspective views of an imaging device 105 for determining the identity of a liquid within a liquid dispenser according to exemplary embodiments of the invention. FIG. 3A shows a side view of the imaging device 105, and FIG. 3B shows an off-axis top view of the imaging device 105. A holder 110 is configured to retain the liquid dispenser 230. The diameter of the holder 110 may be adjustable in order to accommodate liquid dispensers 230 having different circumferences. The holder 110 includes mounts 225 that are configured to hold the first lens 210 and the fiber bundle 220. The mounts 225 may include hinges that allow the angle of the first lens 210 to be adjusted with respect to an axis that is parallel to the surface of the liquid dispenser 230. Alternatively or in addition, the mounts 225 may include clamps that allow the first lens 210 to be moved toward or away from the surface of the liquid dispenser 230. A bottom surface 240 of the holder 110 may be configured to rest on the user's face in front of the user's eye while the user dispenses the liquid within the liquid dispenser 230.

Figure 4:
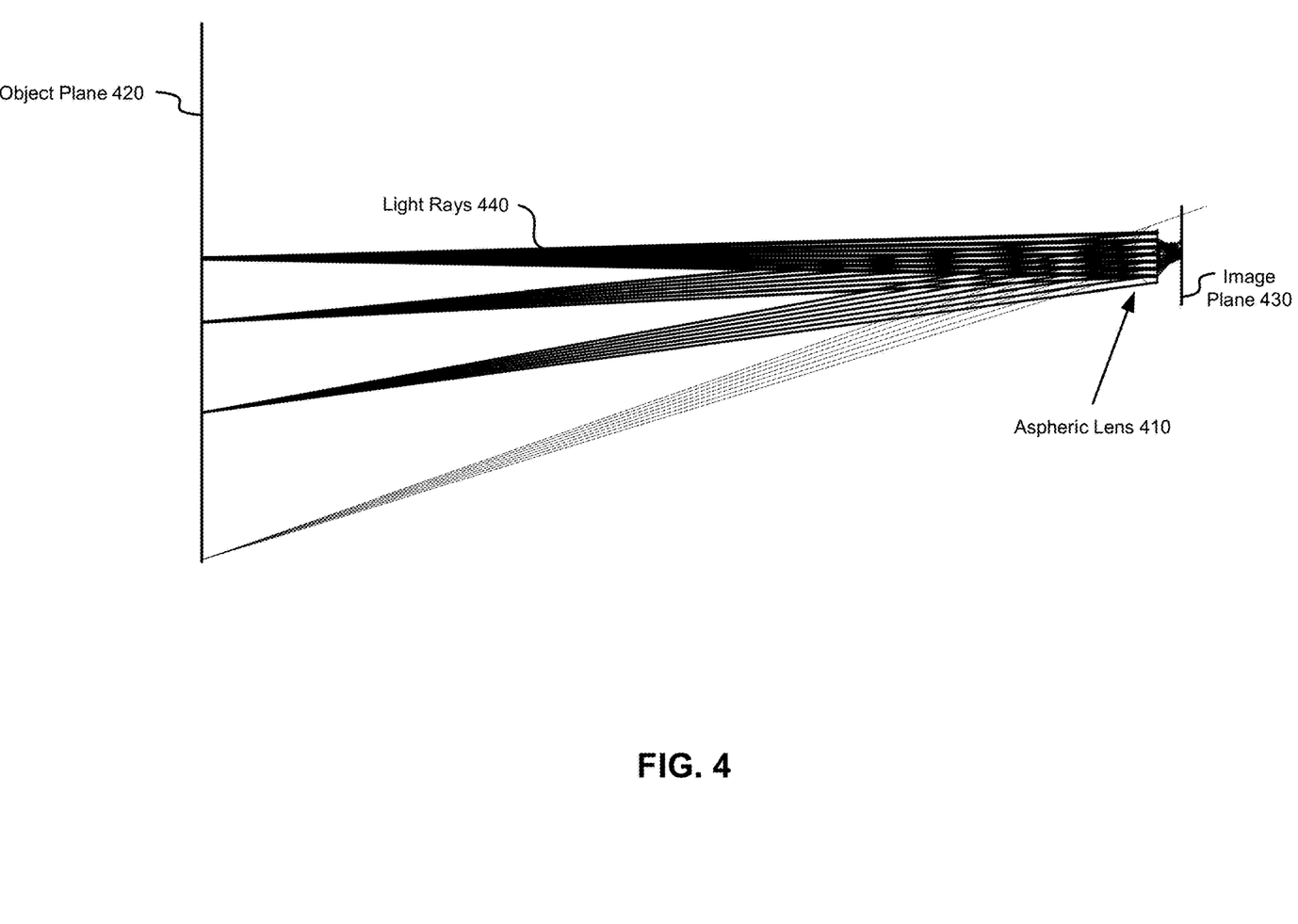
FIG. 4 shows a layout of an imaging device using an aspheric lens.
Figure 5A:
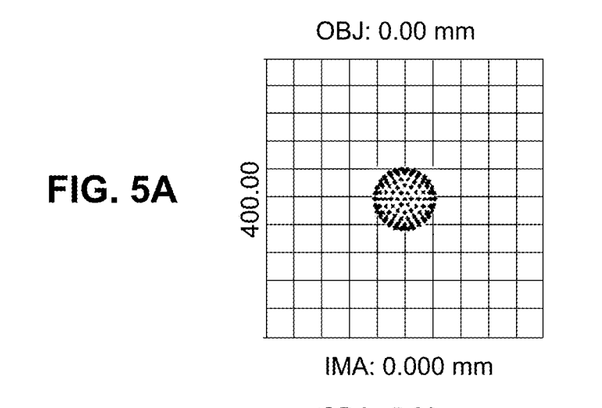
FIGS. 5A-5D show spot diagrams of an imaging device at different transverse locations.
Figure 5B:
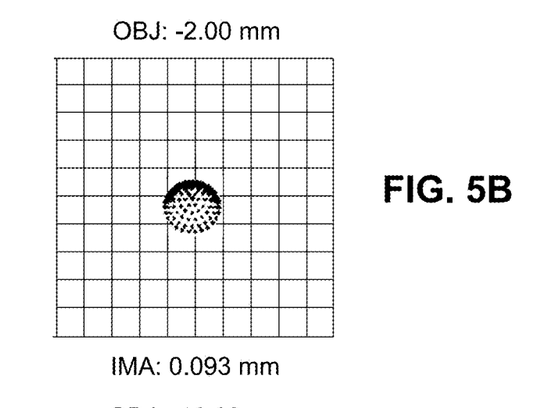
Figure 5C:
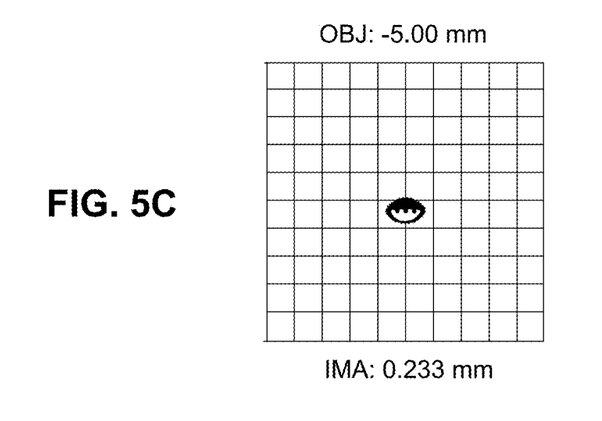
Figure 5D:
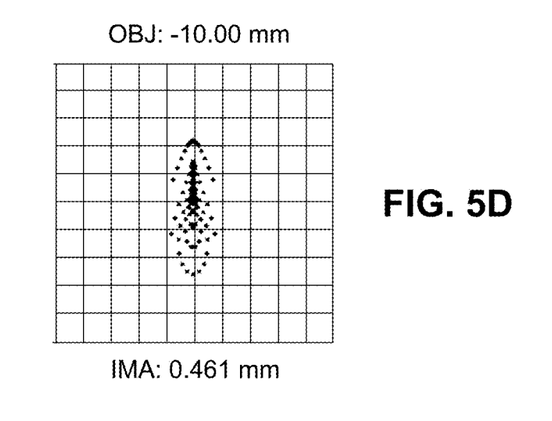

FIG. 4 shows a layout of an imaging device using an aspheric lens. The aspheric lens 410 is an example of the first lens 210 shown in FIGS. 2, 3A, and 3B. As shown in FIG. 4, the aspheric lens 410 focuses light rays 440 from the object plane 420 onto the image plane 430. Each of the bundles of light rays 440 comes from a different point on the object. Each of the bundles of light rays 440 may include light having a different wavelength. For example, the top bundle of light rays 440 may include blue light, the next bundle of light rays 440 may include green light, the next bundle of light rays 440 may include red light, and the bottom bundle of light rays 440 may include yellow light.

FIGS. 5A-5D show spot diagrams of an imaging device at different transverse locations. In this example, the first lens 210 is 40 cm from the surface of the liquid dispenser 230, and the first lens 210 has a demagnification of about 20×. In FIGS. 5A-5D, the axes are spatial coordinates at the image plane. OBJ represents a point on the object plane (the distance from the optical axis). So an OBJ of 10 mm would be at 10 mm from the optical axis. IMA shows where that point would be imaged onto the image sensor. Therefore, a spot that is 10 mm from the optical axis at the object is imaged at 0.461 mm from the optical axis on the sensor.

Figure 6:
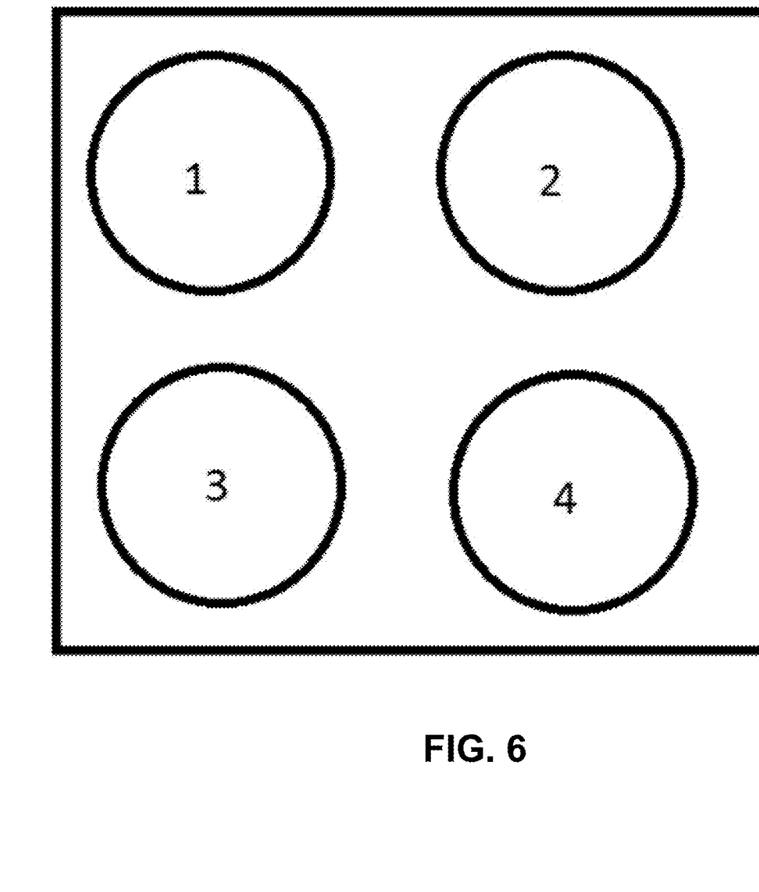
FIG. 6 shows a schematic representation of a plurality of images from an imaging device on a single imaging sensor.

FIG. 6 shows a schematic representation of a plurality of images from an imaging device on a single imaging sensor. The space between the images is exaggerated for clarity. In this example, four lenses with four corresponding fiber bundles are used to form four separate images on the imaging sensor 120. In other embodiments, the four images may overlap each other, at least partially. For example, if all four lenses are oriented at the same angle with respect to an axis that is parallel to the surface of the liquid dispenser 230, the four images may be stitched together to form a panoramic image of the surface of the liquid dispenser 230. Alternatively, if the four lenses are oriented at different angles with respect to an axis that is parallel to the surface of the liquid dispenser 230, the four images may show the surface of the liquid dispenser 230 at different heights.

Figure 7A:
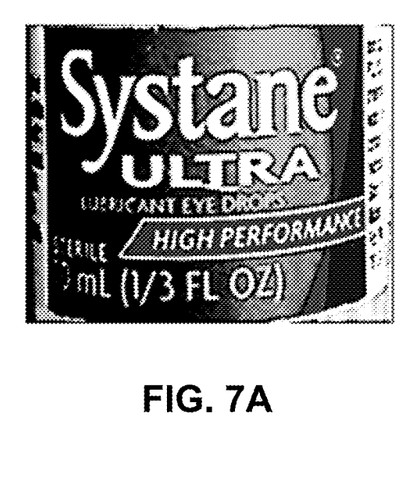
FIGS. 7A-7C show images of a liquid dispenser under different imaging conditions.
Figure 7B:
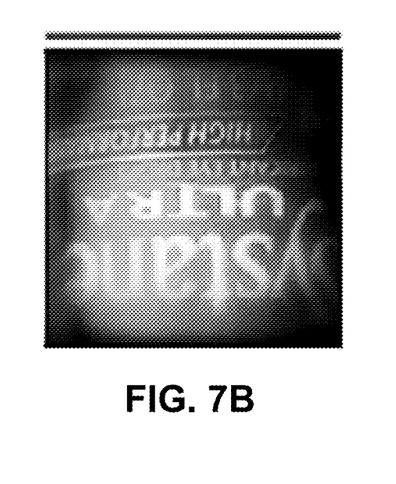
Figure 7C:
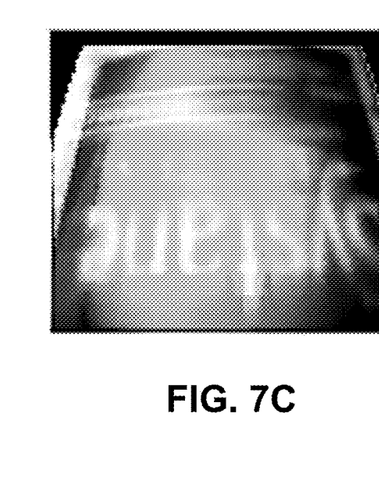
Figure 8A:
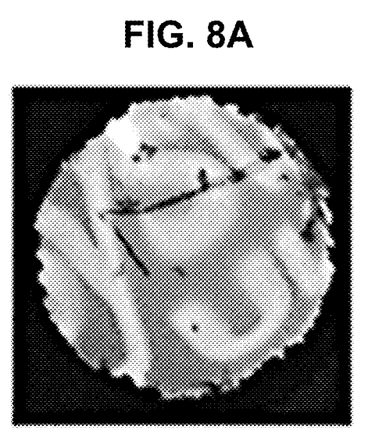
FIGS. 8A-8F show images of a liquid dispenser acquired by the imaging device at different distances from the lens to the closest portion of the surface of the liquid dispenser.
Figure 8B:
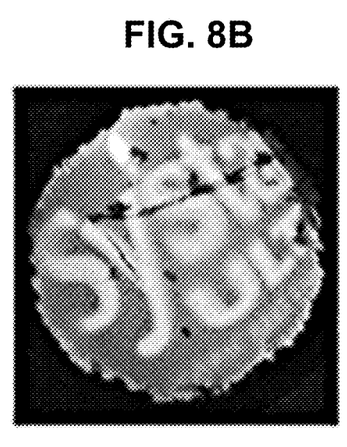
Figure 8C:
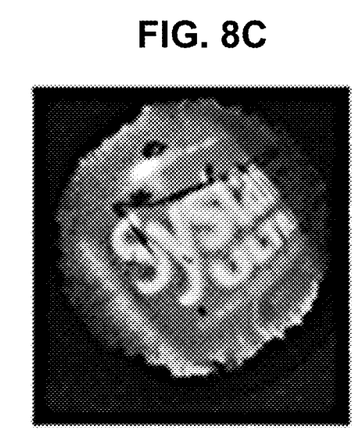
Figure 8D:
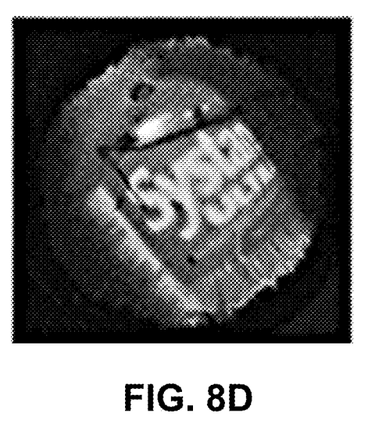
Figure 8E:
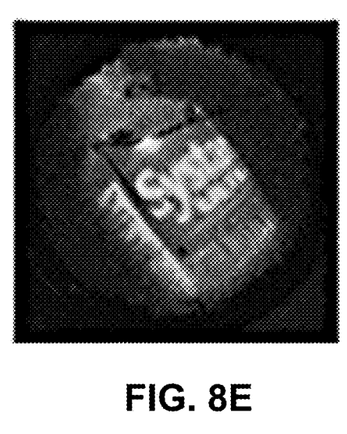
Figure 8F:
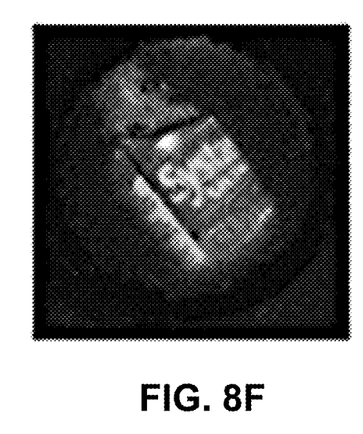

FIGS. 7A-7C show images of a liquid dispenser under different imaging conditions. FIG. 7A shows a high-resolution image of the liquid dispenser that was taken by a smartphone camera. FIG. 7B shows a simulated image of the liquid dispenser that could be acquired by the imaging device at a distance of 40 mm from the surface of the liquid dispenser, and FIG. 7C shows a simulated image of the liquid dispenser that could be acquired by the imaging device when the lens is tilted at an angle of 45° with respect to an axis that is parallel to the surface of the liquid dispenser. FIGS. 7A-7C show that the label should be sufficiently readable for analysis by the artificial neural network 140.

FIGS. 8A-8F show images of a liquid dispenser acquired by the imaging device at different distances from the lens to the closest portion of the surface of the liquid dispenser. The image shown in FIG. 8A was acquired at a distance of 1 cm, the image shown in FIG. 8B was acquired at a distance of 2 cm, the image shown in FIG. 8C was acquired at a distance of 3 cm, the image shown in FIG. 8D was acquired at a distance of 4 cm, the image shown in FIG. 8E was acquired at a distance of 5 cm, and the image shown in FIG. 8F was acquired at a distance of 6 cm. As shown in FIGS. 8A-8F, although the magnification of the image changes with distance, the image remains largely in focus. The label should be sufficiently readable for analysis by the artificial neural network 140.

FIGS. 8A-8F also show that the angular coverage of the liquid dispenser increases as the distance from the lens to the closest portion of the surface of the liquid dispenser increases. For example, the angular coverage is almost 180° at a distance greater than 3 cm. At shorter distances, at least three lenses with their associated fiber bundles are likely required to achieve full angular coverage for each elevation. Full angular coverage may enable the imaging system to be robust against the user putting the bottle into the liquid dispenser at different orientations, as well as the varying locations where the pharmacist might affix the label on the surface of the liquid dispenser.

Figure 9A:
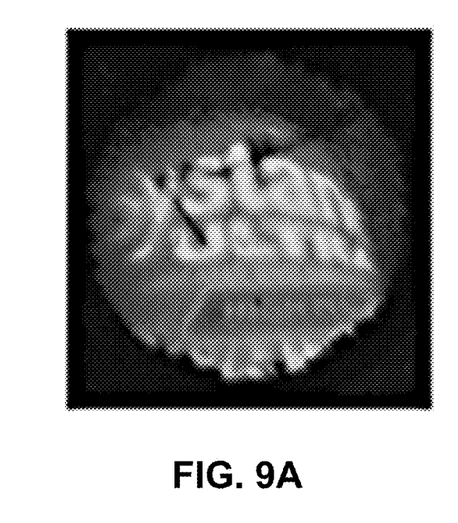
FIGS. 9A-9C show images of a liquid dispenser acquired by the imaging device at different angles of the lens with respect to an axis that is parallel to the surface of the liquid dispenser.
Figure 9B:
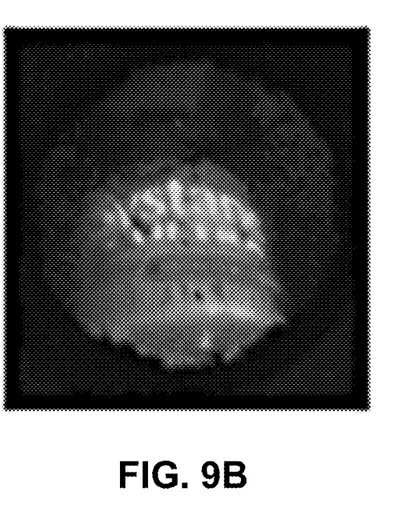
Figure 9C:
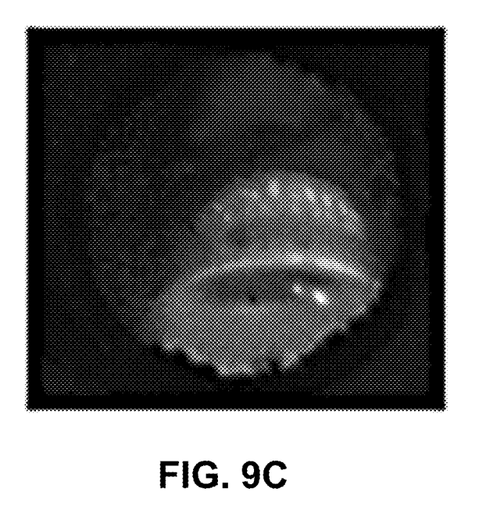

FIGS. 9A-9C show images of a liquid dispenser acquired by the imaging device at different angles of the lens with respect to an axis that is parallel to the surface of the liquid dispenser. The image shown in FIG. 9A was acquired at an angle of 30°, the image shown in FIG. 9B was acquired at an angle of 45°, and the image shown in FIG. 9C was acquired at an angle of 65°. FIGS. 9A-9C show that the label should be sufficiently readable for analysis by the artificial neural network 140, such that liquid dispensers having different shapes and sizes may be analyzed.

Figure 10:
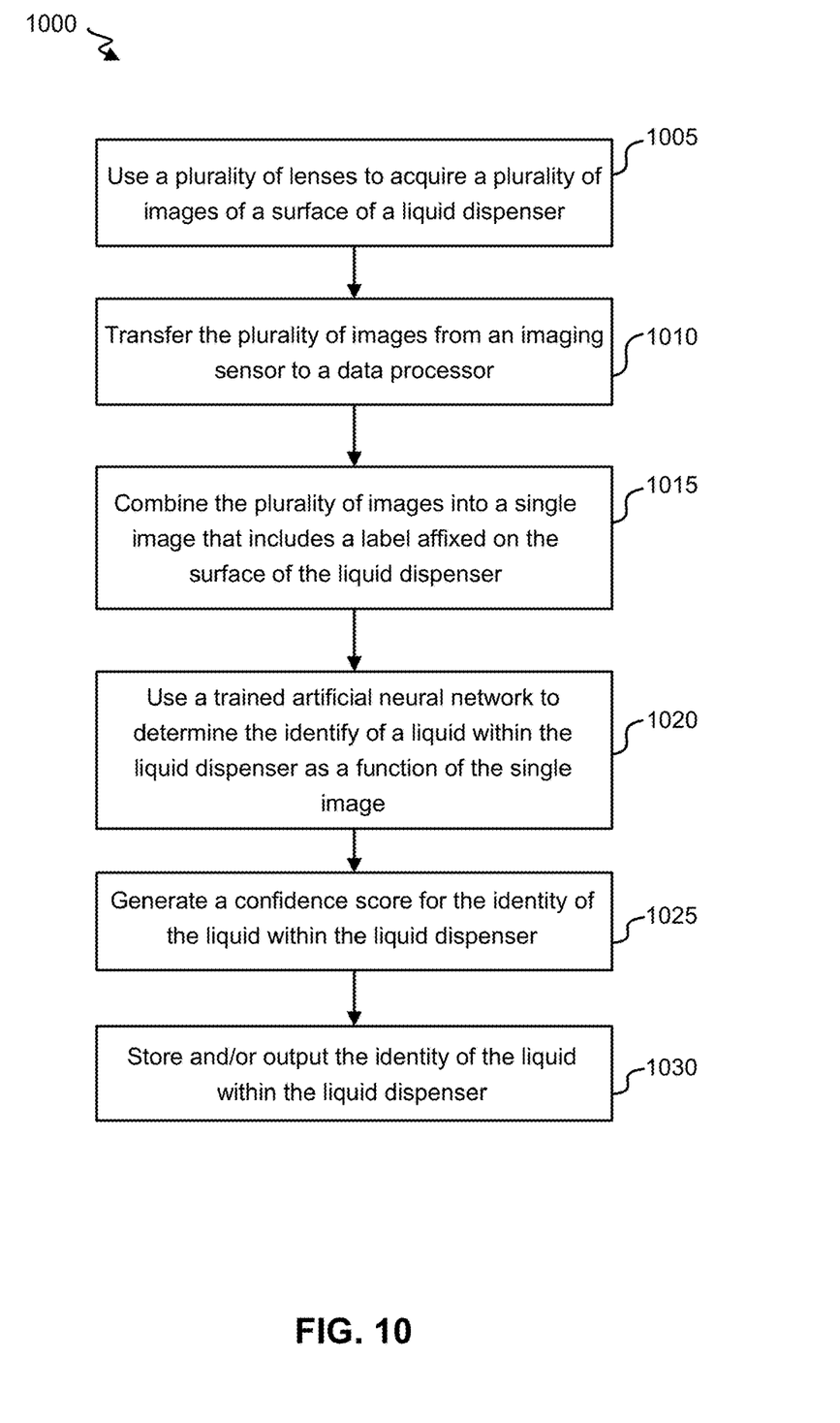
FIG. 10 shows a flow diagram of a method for determining the identity of a liquid within a liquid dispenser according to exemplary embodiments of the invention.

FIG. 10 shows a flow diagram of a method 1000 for determining the identity of a liquid within a liquid dispenser according to exemplary embodiments of the invention. At block 1005, a plurality of lenses are used to acquire a plurality of images of a surface of a liquid dispenser. The plurality of images are then transferred from an imaging sensor to a data processor at block 1010. The data processor may combine the plurality of images into a single image that includes a label affixed on the surface of the liquid dispenser at block 1015.

The method 1000 may use a trained artificial neural network to determine the identity of a liquid within the liquid dispenser by analyzing the single image at block 1020. Alternatively, the artificial neural network may analyze some or all of the plurality of images individually to determine the identity of the liquid. The artificial neural network may then generate a confidence score for the identity of the liquid at block 1025. The identity of the liquid, along with the timestamp and dosage of each administration of the liquid, may be stored and/or output at block 1030.

Specific details are given in the above description to provide a thorough understanding of the embodiments. However, it is understood that the embodiments can be practiced without these specific details. For example, circuits can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A device comprising:
a holder having an opening that is configured to retain a liquid dispenser, wherein a surface of the liquid dispenser is configured to affix a label identifying a liquid within the liquid dispenser;
a plurality of lenses mounted on the holder, wherein each lens of the plurality of lenses has a respective field of view that includes a respective portion of the surface of the liquid dispenser;
a plurality of fiber bundles, wherein each fiber bundle of the plurality of fiber bundles comprises a plurality of optical fibers, and wherein each fiber bundle is coupled to a respective one of the plurality of lenses; and
an imaging sensor that is configured to receive signals from the plurality of fiber bundles and to form a plurality of images of the surface of the liquid dispenser as a function of the signals.

2. The device according to claim 1, wherein:
the plurality of lenses comprises a first lens and a second lens,
the first lens is oriented at a first angle with respect to an axis that is parallel to the surface of the liquid dispenser,
the second lens is oriented at a second angle with respect to the axis, and
the second angle is different from the first angle.

3. The device according to claim 1, wherein:
the plurality of lenses comprises a first lens and a second lens,
the first lens has a first demagnification,
the second lens has a second demagnification, and
the second demagnification is different from the first demagnification.

4. The device according to claim 1, wherein each lens of the plurality of lenses is oriented at a same angle with respect to an axis that is parallel to the surface of the liquid dispenser.

5. The device according to claim 1, wherein a respective output of each fiber bundle of the plurality of fiber bundles is butt-coupled to the imaging sensor.

6. The device according to claim 1, further comprising a relay lens that is configured to relay the signals from respective outputs of the plurality of fiber bundles to the imaging sensor, and wherein each of the plurality of fiber bundles comprises an input configured to receive a respective signal from the respective one of the plurality of lenses.

7. The device according to claim 1, further comprising a transmitter that is configured to output the plurality of images of the surface of the liquid dispenser.

8. The device according to claim 1, further comprising a light source that is configured to illuminate the surface of the liquid dispenser.

9. The device according to claim 1, wherein the plurality of lenses are configured such that a combination of the respective fields of view of the plurality of lenses covers an entire circumference of the surface of the liquid dispenser.

10. A system comprising:
a holder having an opening that is configured to retain a liquid dispenser, wherein a surface of the liquid dispenser is configured to affix a label identifying a liquid within the liquid dispenser;
a plurality of lenses mounted on the holder, wherein each lens of the plurality of lenses has a respective field of view that includes a respective portion of the surface of the liquid dispenser;
a plurality of fiber bundles, wherein each fiber bundle of the plurality of fiber bundles comprises a plurality of optical fibers, and wherein each fiber bundle is coupled to a respective one of the plurality of lenses;
an imaging sensor that is configured to receive signals from the plurality of fiber bundles and to form a plurality of images of the surface of the liquid dispenser as a function of the signals;
one or more data processors; and
a non-transitory computer readable storage medium containing instructions that when executed on the one or more data processors, cause the one or more data processors to perform actions including:
receiving the plurality of images of the surface of the liquid dispenser from the imaging sensor; and
using a trained artificial neural network to determine an identity of the liquid within the liquid dispenser as a function of the plurality of images of the surface of the liquid dispenser.

11. The system according to claim 10, wherein the instructions further cause the one or more data processors to perform actions including combining the plurality of images of the surface of the liquid dispenser into a single image that includes the label affixed on the surface of the liquid dispenser, wherein the one or more data processors determine the identity of the liquid within the liquid dispenser as a function of the single image.

12. The system according to claim 11, wherein the one or more data processors determine the identity of the liquid within the liquid dispenser as a function of the label within the single image.

13. The system according to claim 10, wherein:
the plurality of lenses comprises a first lens and a second lens,
the first lens is oriented at a first angle with respect to an axis that is parallel to the surface of the liquid dispenser,
the second lens is oriented at a second angle with respect to the axis, and
the second angle is different from the first angle.

14. The system according to claim 10, wherein:
the plurality of lenses comprises a first lens and a second lens,
the first lens has a first demagnification,
the second lens has a second demagnification, and
the second demagnification is different from the first demagnification.

15. The system according to claim 10, wherein each lens of the plurality of lenses is oriented at a same angle with respect to an axis that is parallel to the surface of the liquid dispenser.

16. The system according to claim 10, wherein a respective output of each fiber bundle of the plurality of fiber bundles is butt-coupled to the imaging sensor.

17. The system according to claim 10, further comprising a relay lens that is configured to relay the respective signals from respective outputs of the plurality of fiber bundles to the imaging sensor, and wherein each of the plurality of fiber bundles comprises an input configured to receive a respective signal from the respective one of the plurality of lenses.

18. The system according to claim 10, further comprising a transmitter that is configured to output the plurality of images of the surface of the liquid dispenser.

19. The system according to claim 10, further comprising a light source that is configured to illuminate the surface of the liquid dispenser.

20. The system according to claim 10, wherein the plurality of lenses are configured such that a combination of the respective fields of view of the plurality of lenses covers an entire circumference of the surface of the liquid dispenser.

* * * * *